US006990537B2

(12) United States Patent
Chan et al.

(10) Patent No.: US 6,990,537 B2
(45) Date of Patent: Jan. 24, 2006

(54) SYSTEM AND METHOD FOR CONTROLLING MULTI-COMPONENT COMMUNICATIONS VIA A BUS BY CAUSING COMPONENTS TO ENTER AND EXIT A HIGH-IMPEDANCE STATE

(75) Inventors: Ming Hong Chan, San Jose, CA (US); Elim Huang, Cupertino, CA (US); Andy Ho, Hong Kong (HK)

(73) Assignee: ESS Technology, Inc., Fremont, CA (US)

( * ) Notice: Subject to any disclaimer, the term of this patent is extended or adjusted under 35 U.S.C. 154(b) by 323 days.

(21) Appl. No.: 10/391,653

(22) Filed: Mar. 18, 2003

(65) Prior Publication Data

US 2004/0024929 A1   Feb. 5, 2004

Related U.S. Application Data

(60) Provisional application No. 60/400,804, filed on Aug. 3, 2002.

(51) Int. Cl.
*G06F 13/42* (2006.01)
*G06F 13/00* (2006.01)
*G06F 9/00* (2006.01)
*H05K 7/00* (2006.01)

(52) U.S. Cl. ............. 710/5; 710/14; 710/107; 710/113; 710/305; 712/34

(58) Field of Classification Search .............. 710/5, 710/14, 107, 113, 305; 712/34

See application file for complete search history.

(56) References Cited

U.S. PATENT DOCUMENTS

| 4,811,345 | A | * | 3/1989 | Johnson .................. 714/27 |
| 5,109,333 | A | * | 4/1992 | Kubota et al. ............ 712/34 |
| 5,218,682 | A | * | 6/1993 | Frantz .................... 710/105 |
| 5,491,787 | A | * | 2/1996 | Hashemi ................. 714/11 |
| 5,721,838 | A | * | 2/1998 | Takahashi et al. ....... 710/302 |
| 6,163,828 | A |   | 12/2000 | Landi et al. ............. 710/107 |
| 6,401,197 | B1 |   | 6/2002 | Kondo |

FOREIGN PATENT DOCUMENTS

JP           11338592 A    * 12/1999

OTHER PUBLICATIONS

Bus Arbitration Method for a Two Way Multiprocessor; IBM Technical Disclosure Bulletin, Oct. 1992, US; http://127.0.0.1:4343/C:/APPS/EAST/cache/eas20040217101336806.temp?text_font=Times%.

* cited by examiner

*Primary Examiner*—Tammara Peyton
(74) *Attorney, Agent, or Firm*—Farjami & Farjami LLP

(57) ABSTRACT

A method for controlling communication on a bus connecting a first processor, a second processor, and a device. The method transmits a first control signal from the first processor to the second processor via a control signal line, causing a bus connection of the second processor to enter a high-impedance state, transfers data between the device and the first processor via the bus, then setting a bus connection of the first processor to the high-impedance state, and transmits a second control signal from the first processor to the second processor via the control signal line, causing the bus connection of the second processor to exit the high-impedance state.

16 Claims, 2 Drawing Sheets

SYSTEM AND METHOD FOR CONTROLLING MULTI-COMPONENT COMMUNICATIONS VIA A BUS BY CAUSING COMPONENTS TO ENTER AND EXIT A HIGH-IMPEDANCE STATE

BACKGROUND

This application claims priority from provisional application U.S. Ser. No. 60/400,804 filed on Aug. 3, 2002.

TECHNICAL FIELD

The present disclosures relates to a method and system for controlling communication on a signal bus. More specifically, the present disclosure relates to a method and system for controlling processors communicating with a memory via a signal bus.

DESCRIPTION OF THE RELATED ART

Modem electronic devices often include two or more processors, each with semi-permanent data, for example, software code, which may be accessed upon system startup and, therefore, must be stored in non-volatile memory. Depending upon their function and configuration, processors may require different quantities of non-volatile memory for storing data. In one example, a general purpose processor may require large quantities of data be stored in non-volatile memory, while other processors, such as some special purpose processors, may require smaller quantities. In order to minimize costs and components, a single, larger, non-volatile memory may be shared, storing data for each of the processors.

Some processors in a system may not require continuous access to data. For example, some processors may require access upon initialization, or at intervals during operation. Processors capable of executing instructions from Random Access Memory (RAM), may retrieve data from a non-volatile memory, for example, Read Only Memory (ROM); and store the data in RAM, thereby reducing or eliminating a need to access ROM during operation.

The processors may be connected to the non-volatile memory via one or more signal lines known as a "bus", which may include signal lines for transferring address, data, and control information between the processors and the memory. Due to physical constraints, only one component, for example, a processor or memory, may transmit data on a signal line at a time. Because it is inefficient and costly to provide a separate memory and bus for each processor in a system, it is desirable to provide a system where processors share a bus. Bus sharing may be accomplished by employing any of a number of complex timing and interrupt schemes, each with its own set of difficulties and disadvantages.

Bus sharing is facilitated by the use of tri-state technology. Tri-state is a feature of a digital electronic component, for example, a processor, which allows a connector pin to have one of the three following configurations: logic low (0V), logic high (typically +5V), or high-impedance (open circuit).

Tri-state allows one or more components to connect to a signal line in high-impedance state, while another component in an active state drives a voltage, for example, corresponding to a logical '1' or a '0', onto the signal line. When placed in a high-impedance state, the connector pins appear as an open circuit, and cannot be damaged by the output of other components driving signals onto the signal line. When the connector pins are not in a high-impedance state, also known as an "active" state, the connector pins no longer appear as an open circuit and may drive a signal, for example, 0 or +5V, onto the signal line.

While tri-state allows multiple components to connect to a bus, a solution is required for the more difficult problem of controlling the order and manner in which those components communicate over the bus. Therefore, there is a need for a robust, low-cost system for controlling multi-component communication via a bus.

SUMMARY

The present disclosure relates to a method for controlling communication on a bus connecting a first processor, a second processor, and a device, comprises transmitting a first control signal from the first processor to the second processor via a control signal line, causing a bus connection of the second processor to enter a high-impedance state, transferring data between the device and the first processor via the bus, then setting a bus connection of the first processor to the high-impedance state, and transmitting a second control signal from the first processor to the second processor via the control signal line, causing the bus connection of the second processor to exit the high-impedance state.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
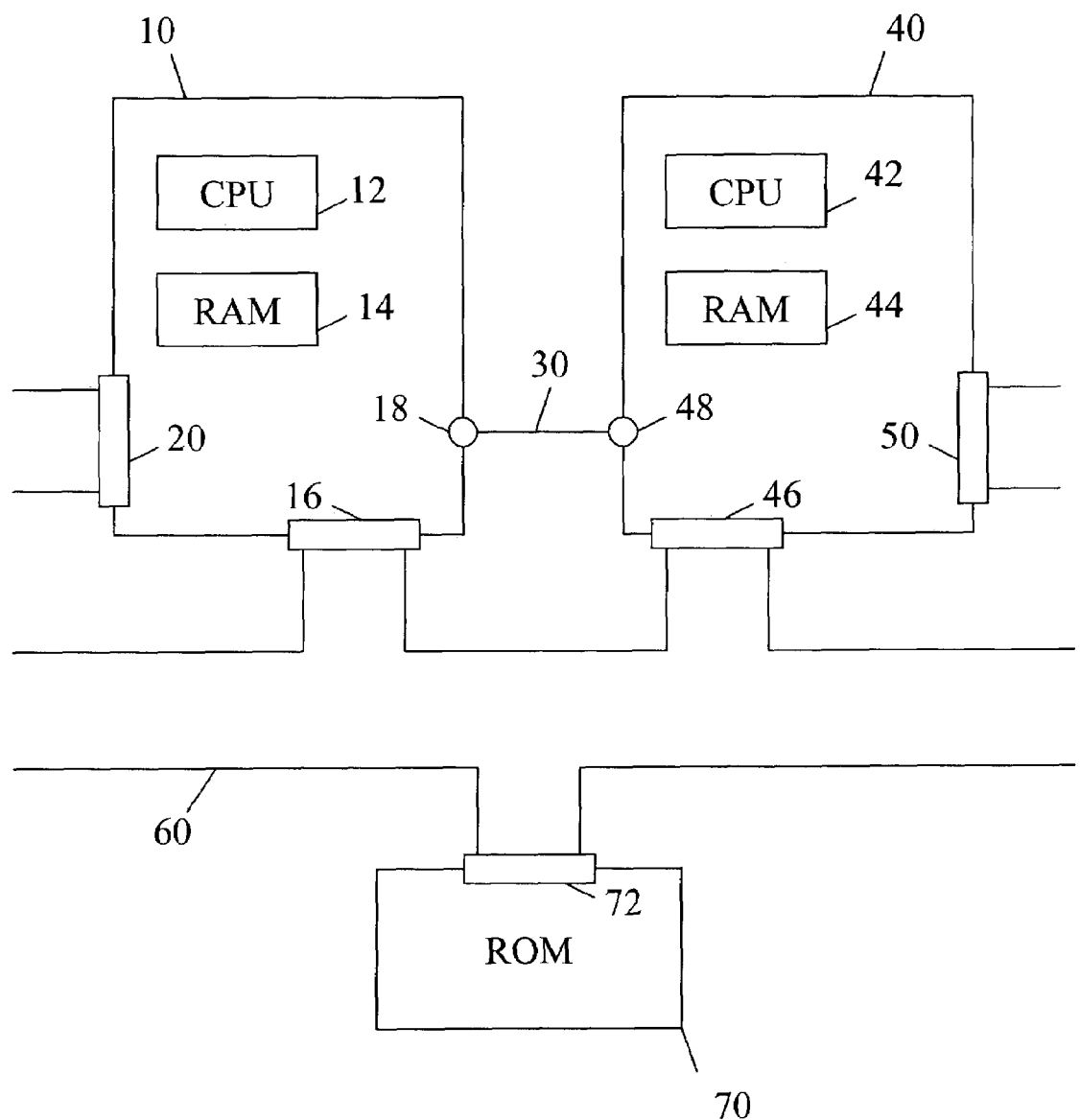
FIG. 1 shows a system capable of implementing a process for controlling communication according to an embodiment of the present disclosure.

In describing a preferred embodiment of the present disclosure illustrated in the drawings, specific terminology is employed for sake of clarity. The present disclosure is not intended to be limited to the specific terminology so selected, and it is to be understood that each specific element includes all technical equivalents which operate in a similar manner.

FIG. 1 shows a system capable of implementing the system and method of the present disclosure. As shown in FIG. 1, a main processor 10 includes a central processing unit (CPU) 12, and on-chip RAM 14, which may be, for example, SRAM or SDRAM. In another aspect of the system and method of the present disclosure, RAM 14 may be located externally of the main processor 10 and may be accessed via, for example, additional connector pins 20.

The main processor 10 further includes connector pins 16 connected to a bus 60, as well as additional connector pins 20 connected to power as well as other buses and devices. An Auxiliary pin 18 of the main processor 10 is connected to a Reset pin 48 of the Servo Control Processor (SCP) 40 via a signal line 30. In one aspect of the system and method of the present disclosure, the main processor 10 may further include a bootROM for storing data.

The main processor 10 may be a general purpose processor, and may have additional capabilities, such as, for example, processing user input, controlling a display, or data coding/decoding. The SCP 40 may be a general purpose processor, or may be a processor for interfacing with and controlling servo devices, for example, a loading mechanism in a media player, such as a CD or DVD device. In one aspect of the system and method of the present disclosure, the main processor 10 and SCP 40 may be modules on a single integrated circuit chip. As will be understood by one skilled in the art, the system and method of the present disclosure need not be limited to processors of a particular function or configuration.

The SCP 40 includes a CPU 42, connector pins 46 connected to the bus 60, as well as additional connector pins 50 for connecting to power and other buses and devices. The SCP 40 may further include on-chip RAM 44 for storing data. In another aspect of the system and method of the present disclosure, RAM 44 may be located externally of the SCP 40 and may be accessed via, for example, additional connector pins 50

Both the main processor 10 and SCP 40 are capable of tri-state connector pin operation. For example, the main processor 10 controls the high-impedance state of connector pins 16, and the SCP 40 may place connector pins 46 in a high-impedance state when the SCP 40 is in a reset state.

The ROM 70 includes connector pins 72 connected to the bus 60 and may be any one of a number of types of ROM, for example, EEPROM, or FlashROM. In another aspect of the system of the present disclosure, other types of memory, for example, a hard disk device, or a Random Access Memory (RAM), may be used in place of ROM 70.

Figure 2:
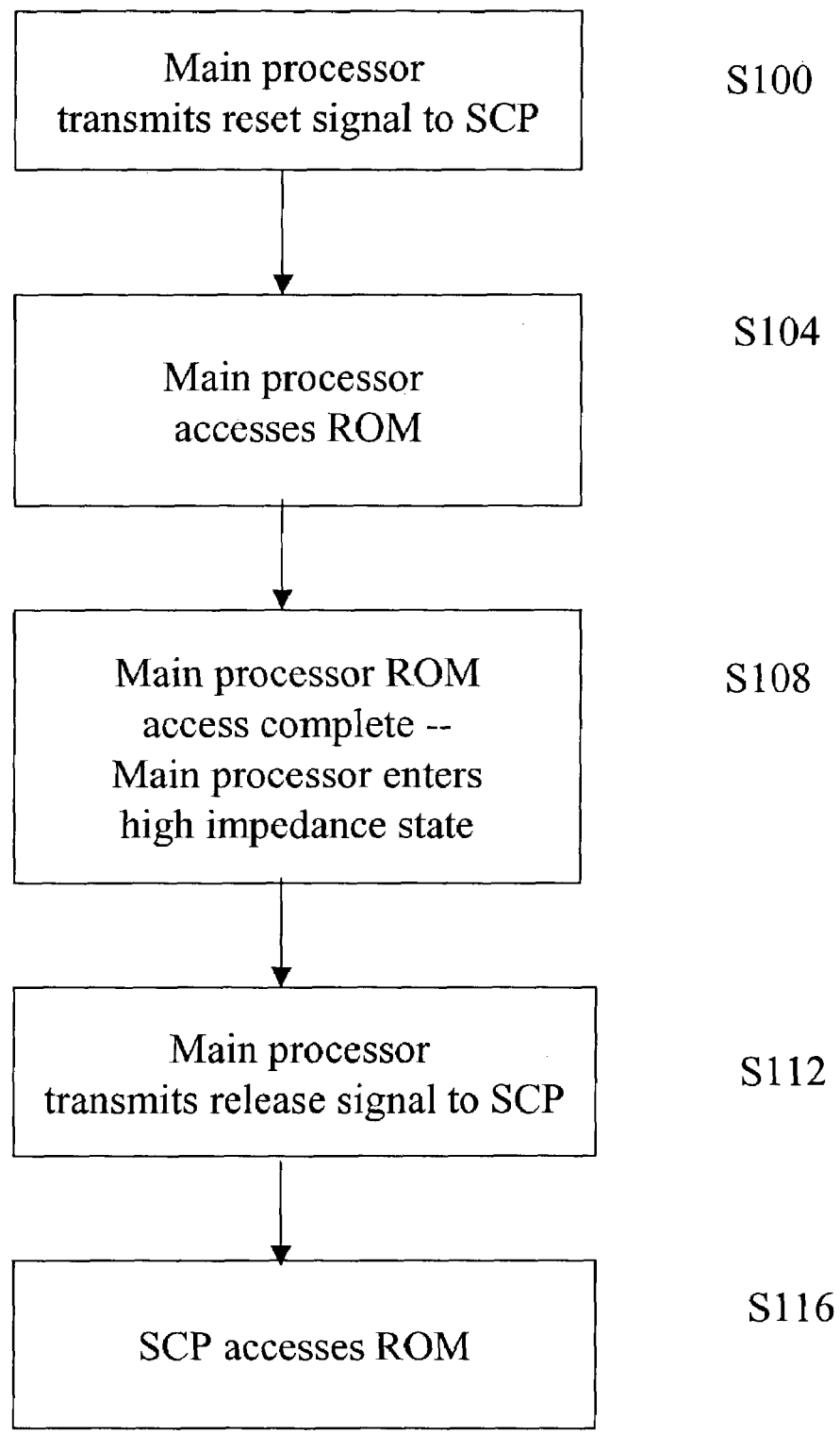
FIG. 2 shows a flowchart of a process for controlling communication according to an embodiment of the present disclosure.

FIG. 2 shows a flowchart according to the system and method of the present disclosure. The steps shown in FIG. 2 may take place, for example, upon initialization or system boot-up. In Step S100, the main processor 10 transmits a reset signal from the Auxiliary pin 18 to the Reset pin 48 of the SCP 40 via the signal line 30. The reset signal transmission from the main processor 10 may take place automatically upon powering the main processor 10, or may occur upon execution of a predetermined instruction, such as, when reprogramming the ROM as described below.

The reset signal may be, for example, a logic high signal. Upon receipt of the reset signal, the SCP 40 enters a reset state, causing the connector pins 46 connected to the bus 60 to enter a high-impedance state. The SCP 40 is held in reset state until a release signal is transmitted in Step S112.

In Step S104, the main processor 10 accesses the ROM 70. During this step, the main processor may receive data, for example, instruction code, which may be stored in RAM 14 or in external RAM connected to additional connector pins 20.

In Step S108, the main processor 10 completes accessing the ROM 70 and places connector pins 16 connected to the bus 60 in a high-impedance state. The main processor may communicate with other components and buses while connector pins 16 are in high-impedance state. In contrast with the SCP 40, the main processor 10 is not in reset state and continues to operate or execute instructions while connector pins 16 are in high-impedance state.

At this point, both the SCP connector pins 46 and main processor connector pins 16 are in high-impedance state, the SCP 40 is in reset state, and the main processor 10 is not in reset state.

In Step S112, the main processor 10 transmits a release signal from the Auxiliary pin 18 to the Reset pin 48 of the SCP 40. For example, if the reset signal is represented by a logic "high" or '1' signal, the release signal may be a logic "low" or '0' signal. No longer in reset, the SCP 40 may access the bus 60.

In Step S116, the SCP 40 accesses the ROM 70 and may retrieve data, for example, instruction code, which may be executed directly or may be stored in RAM 44.

ROM Reprogramming

In another aspect of the system of the present disclosure, data stored on media, for example, a compact disk, inserted into a media player may be written to the ROM 70 when the ROM 70 is a writable type ROM, for example, FlashROM. Data may be read from a CD inserted in the unit and loaded into RAM 14 in the main processor 10. At this point, the process may proceed in a manner similar to that shown in FIG. 2. In Step S100, the main processor 10 transmits the reset signal from Auxiliary pin 18 to the Reset pin 48 of the SCP 40 via the signal line 30. At this point, if the main processor connector pins 16 are in a high-impedance state, the main processor returns them to an active state.

In Step S104, the main processor 10 transmits the update data from RAM 14 via the bus 60 to the ROM 70 where it is stored. In Step S108, when the transmission is complete, the main processor 10 places connector pins 16 connected to the bus 60 in a high-impedance state. In step S112, the main processor transmits a release signal to the Reset pin 46 of the SCP 40, and in Step S116, the SCP 40 may access the ROM 70.

Numerous additional modifications and variations of the present disclosure are possible in view of the above-teachings. It is therefore to be understood that within the scope of the appended claims, the present disclosure may be practiced other than as specifically described herein.

What is claimed is:

1. A method for controlling communication on a bus connecting a first processor, a second processor, and a device, the method comprising:
    transmitting a first control signal from the first processor to the second processor via a control signal line to cause the second processor to enter a reset state, wherein, while in the reset state, the second processor ceases to execute instructions and a bus connection of the second processor enters a high-impedance state;
    transferring data between the device and the first processor via the bus then setting a bus connection of the first processor to the high-impedance state, while the second processor is in the reset state; and
    transmitting a second control signal from the first processor to the second processor via the control signal line to transition the second processor from the reset state to a release state, wherein, while in the release state, the second processor executes instructions and the bus connection of the second processor exits the high-impedance state.

2. The method of claim 1, wherein the device is a memory.

3. The method of claim 1, wherein the first processor has a memory for storing the data transferred from the device.

4. The method of claim 1, wherein transmitting the first control signal occurs when power is applied to the first processor.

5. The method of claim 1, wherein transmitting the first control signal occurs when the first processor executes an instruction.

6. The method of claim 1, wherein the first processor has an additional bus connection to an additional bus having an impedance controlled independently of the bus connection.

7. The method of claim 1, wherein the second processor has a reset pin for receiving the first control signal and the second control signal.

8. The method of claim 1, further comprising: after transmitting the second control signal, transferring data between the device and the second processor via the bus.

9. A system for controlling communication on a bus, the system comprising:
  a first processor connected to the bus via a first bus connection; and
  a second processor connected to the bus via a second bus connection;
  wherein the first processor is configured to transmit a first control signal to the second processor via a control signal line to cause the second processor to enter a reset state, wherein, while in the reset state, the second processor is configured to cease to execute instructions and the second bus connection enters a high-impedance state;
  wherein, while the second processor is in the reset state, the first processor is configured to transfer data with the device via the first bus connection, to set the first bus connection to the high-impedance state, to transmit a second control signal to the second processor via the control signal line to transition the second processor from the reset state to a release state, wherein, while in the release state, the second processor executes instructions and the second bus connection exits the high-impedance state.

10. The system of claim 9, wherein the device is a memory.

11. The system of claim 9, wherein the first processor has a memory for storing the data transferred from the device.

12. The system of claim 9, wherein transmitting the first control signal occurs when power is appiied to the first processor.

13. The system of claim 9, wherein transmitting the first control signal occurs when the first processor executes an instruction.

14. The system of claim 9, wherein the first processor has an additional bus connection to an additional bus having an impedance controlled independently of the first bus connection.

15. The system of claim 9, wherein the second processor has a reset pin for receiving the first control signal and the second control signal.

16. The system of claim 9, wherein after transmitting the second control signal, the device and the second processor transfer data via the second bus connection.

* * * * *